Oct. 1, 1957   A. A. DORFNER   2,808,207
REGISTER
Filed April 2, 1954

INVENTOR
*ARTHUR A. DORFNER*
BY
*Curtis, Morris & Safford*
ATTORNEYS

United States Patent Office 2,808,207
Patented Oct. 1, 1957

2,808,207

REGISTER

Arthur A. Dorfner, Roselle Park, N. J., assignor to D. S. Plumb Co., Inc., Newark, N. J.

Application April 2, 1954, Serial No. 420,552

4 Claims. (Cl. 235—133)

This invention relates to registers and particularly to mechanisms for registering in correlated sequence a series of data as in the registering of the flow of fluids, for example, in units, hundreds, etc., of gallons.

In such registers it is often desirable that one registering means, as hundreds, be operated step-by-step without intermediate indications, at the times when a hundred units are registered, and it is to the provision of a simple and effective means for performing such operations that the present invention is directed.

The invention is adapted for use in a wide variety of registers including those in which the registration is in the form of the making of a permanent record or in which the registration is one from which a printed or other record can be reproduced as desired, as well as those in which the registration is in the form of positioning a pointer or other element with respect to a dial or other indicating means. For the sake of simplicity the invention is exemplified as embodied in the latter type of device.

The invention accordingly comprises the features of construction, combinations of elements, and arrangement of parts, which will be exemplified in the constructions hereinafter set forth and the scope of the application of which will be indicated in the claims.

For a fuller understanding of the nature and objects of the invention, reference should be had to the following detailed description taken in connection with the accompanying drawings, in which.

Figure 5:
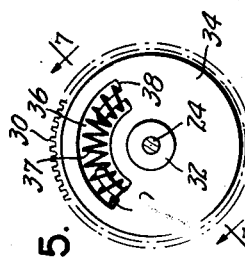
Figure 5 is a top view thereof showing the initial position of the parts.
Figure 6:
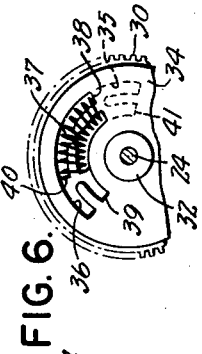
Figure 6 is a fragmentary top view thereof showing the spring under compression.
Figure 4:
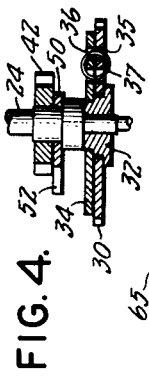
Figure 4 is an enlarged side view of the energy-storage assembly.
Figure 2:
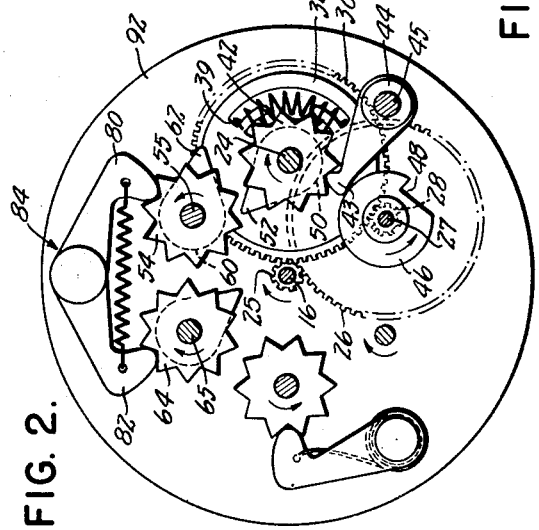
Figure 2 is a similar view with certain of the upper parts removed.
Figure 1:
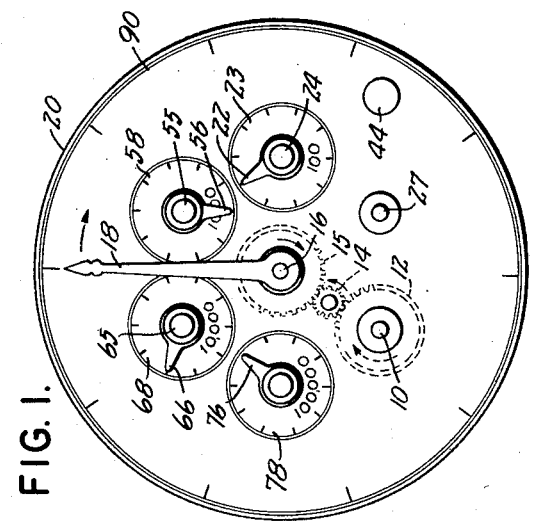
Figure 1 is a top view of one form of register embodying the invention with certain parts not visible from the top shown in broken lines.
Figure 3:
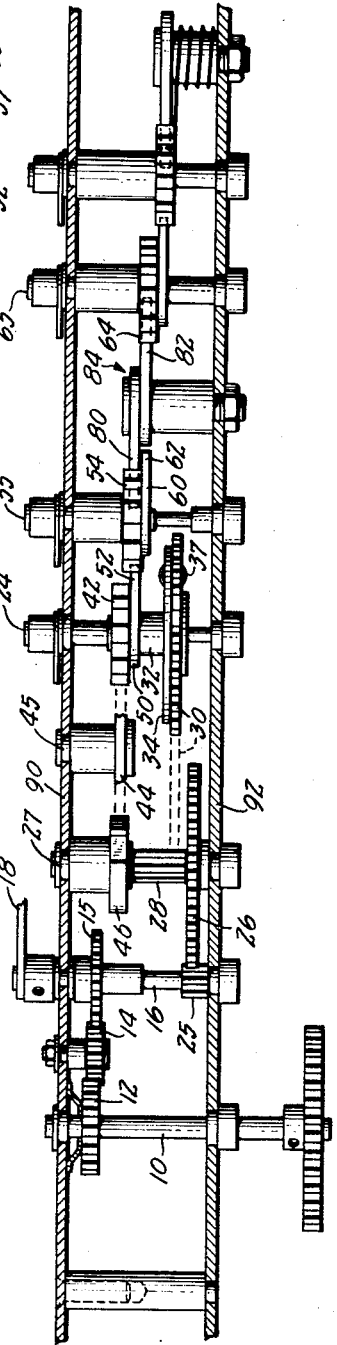
Figure 3 is a diagrammatic side view showing the gear train extended for clearer showing.

The invention is exemplified as embodied in a water meter register comprising a main drive shaft 10 having driving means (not shown) which may be of any well-known or suitable form for operation by water-flow. Fixed on the shaft 10 is a gear 12 meshing, in the present instance, with an idler gear 14 engaging a gear 15 which is fixed on a center shaft 16 operating a registering means which, in the present instance, is in the form of a pointer 18 fixed on the shaft 16 and indicating water flow in units on a scale 20. In order to indicate flow in hundreds by a pointer 22 on a scale 23, there is provided a shaft 24 driven by energy storage mechanism. Integral with the shaft 16 is a pinion 25 meshing with a gear 26 which is integral with a shaft 27, the rotation of which is geared down to one tenth of the speed on the shaft 16 and which might be used in the indication of tens of units. A pinion 28 rotates with the shaft 27. A gear wheel 30 which has a running fit on a hub 32 fixed on shaft 24 meshes with pinion 28. Fixed on the hub 32 is a wheel 34 which is coaxial with the wheel 30. The wheels 30 and 34 have arcuate slots 35 and 36, respectively, therein, in which is set a compression coil spring 37, one end of which bears against shoulders 38 and 39 on the wheel 34 and the other end of which bears against shoulders 40 and 41 on the gear wheel 30. The shaft 24, the hub 32, and the wheel 34 are normally held against movement by a holding-and-release mechanism which comprises, in the present instance, a toothed wheel 42 fixed on the shaft 24 and engaged by one end 43 of a pawl 44. The wheel 42 is normally held against rotation by the pawl 44 which is normally held in place by its engagement with the periphery of a trip release cam disk 46 which is fixed to the shaft 27 and formed with a notch 48 into which the pawl 44 can fit to release the wheel 42 under the urging of the spring 37 to allow a movement of the wheel 42 and consequently of the shaft 24 due to the pressure of the spring 37. The rotation of the shaft will carry the pointer 22 along one-tenth of the circumference of the dial 23. There is also mounted on the hub 32 a disk 50 carrying a lug 52 which at each rotation thereof will advance one notch a ratchet wheel 54 fixed to shaft 55 on which there is carried a pointer 56 adapted to register thousands on a scale 58. A disk 60 on the shaft 55 carries a lug 62 adapted to similarly operate a ratchet wheel 64 fixed on shaft 65 carrying a pointer 66 on a ten thousands scale 68; and other pointers as, for example, a pointer 76 moving over a hundred thousands scale 78, may be similarly operated.

The movement of the ratchet wheels, as 54 and 64, is controlled by suitable indexing pawls, as the pawls 80 and 82 on a double-index pawl 84.

The entire assembly is held in a framework comprising an upper plate 90 and a lower plate 92.

While there are given above certain specific examples of this invention and its application in practical use and there are indicated also certain modifications and alternatives, it should be understood that these are not intended to be exhaustive or to be limiting of the invention. On the contrary, these illustrations and the explanations herein are given in order to acquaint others skilled in the art with this invention and the principles thereof and a suitable manner of its applications in practical use, so that others skilled in the art may be enabled to modify the invention and to adapt it and apply it in numerous forms, each as may be best suited to the requirement of a particular use.

I claim:

1. In a register: a shaft adapted to be driven from driving means; a first flat disk-like element carried by said shaft; a second flat disk-like element carried by said shaft and positioned flush against said first element and rotatable relative thereto, each of said elements having a similarly positioned slot cut into it; a compression spring coupling said elements and carried in said slots, the ends of said spring pressing against the ends of said slots and acting to keep said elements in a given rotational position relative to each other but to permit deviation therefrom; and means to prevent the rotation of said second element relative to said first element for given periods but to permit relative rotation at other periods, whereby continuous rotation of said first element is translated into step by step rotation of said second element and each time said second element is permitted to rotate it is positively indexed by said spring alone.

2. In a register: a first element having a flat surface and adapted for rotation around an axis perpendicular to said surface; a second element adapted for rotation around said axis and relative to said first element and having a flat surface closely adjacent the flat surface of said first element, said surfaces having substantially equal elongated slots cut therein and lying generally at right angles to said axis; a spring carried in said slots in normally stressed condition but being held in equilibrium and acting to keep said elements in a given rotational position relative to each other though yieldable to permit deviation therefrom; operating means to rotate said first element; and means actuated by said operating means for preventing said second element from rotating with said first element for a given time and for freeing said second element for rotation with said first element at a given period, whereby when said second element is freed by said means it will be returned automatically by said spring alone to said given rotational position relative to said first element.

3. In a register having registering means and means for operating said registering means: means for registering a number of operations of said registering means and including a first rotatable element and mechanism for driving said first rotatable element from said operating means, a second rotatable driving element coaxial with said first rotatable element, a first spring engaging portion and a second spring engaging portion both carried on said first element, corresponding third and fourth spring engaging portions carried on said second element and positioned generally opposite said first and second portions respectively; a spring in normally stressed condition engaging each of said portions when said elements are rotatably aligned, but when rotated slightly in one direction relative to each other, said spring engaging said first and third portions only, and when said elements are rotated slightly in the opposite direction said spring engaging said second and fourth portions only, whereby upon rotation of said elements relative to each other in either direction said spring is stressed even more than in its normal condition, and said elements can be held aligned positively by the normal stress in said spring.

4. The combination as set forth in claim 3 wherein said rotatable elements are discs and are formed with equal elongated slots which are aligned with each other and wherein said spring is a partly compressed compression spring seated in said slots and bears against the ends thereof which constitute said four spring engaging portions.

References Cited in the file of this patent

UNITED STATES PATENTS

| | | |
|---|---|---|
| 334,173 | Kaiser | Jan. 12, 1886 |
| 2,191,541 | Poole | Feb. 17, 1940 |
| 2,365,510 | Barnes | Dec. 19, 1944 |
| 2,416,081 | Bakke | Feb. 8, 1947 |

FOREIGN PATENTS

| | | |
|---|---|---|
| 16,941 | Great Britain | Dec. 1, 1915 |